United States Patent [19]

Sixt et al.

[11] 3,830,373

[45] Aug. 20, 1974

[54] CORRUGATED DRAINAGE TUBE WITH RESTRAINING SCREEN

[75] Inventors: Marty E. Sixt, Iowa City, Iowa

[73] Assignee: Advanced Drainage Systems, Inc., Waterville, Ohio

[22] Filed: Apr. 19, 1972

[21] Appl. No.: 245,362

Related U.S. Application Data

[63] Continuation-in-part of Ser. No. 56,098, June 30, 1970, Pat. No. 3,699,684, which is a continuation of Ser. No. 819,339, April 25, 1969, abandoned, which is a continuation of Ser. No. 663,051, Aug. 24, 1967, abandoned.

[52] U.S. Cl.................. 210/489, 21/492, 210/497, 61/11
[51] Int. Cl............................................ E02b 13/00
[58] Field of Search .......... 210/489, 492, 494, 497, 210/499, 505, 503; 61/11, 13, 10, 16, 35

[56] References Cited
UNITED STATES PATENTS

| 3,073,735 | 1/1963 | Till et al. ............................ 210/503 |
| 3,246,766 | 4/1966 | Pall ................................. 210/497 X |
| 3,246,767 | 4/1966 | Pall et al. ............................. 210/505 |
| 3,252,270 | 5/1966 | Pall et al. ....................... 210/505 UX |
| 3,566,607 | 3/1971 | Sixt ......................................... 61/11 |
| 3,699,684 | 6/1970 | Sixt ......................................... 61/11 |

Primary Examiner—Frank A. Spear, Jr.
Assistant Examiner—F. F. Calvetti
Attorney, Agent, or Firm—Connolly and Hutz

[57] ABSTRACT

Flexible corrugated drainage tube comprises alternating annular peaks and annular valleys with walls interconnecting peaks and valleys. Plurality of openings in selected valleys of tube are arranged transversely to longitudinal axis of tube so that liquid water can drain into tube through openings. Water permeable restraining screen surrounds tube and engages peaks thereof for restraining waterborne particles above predetermined size range from entering tube when water drains into tube through screen and openings. Water permeable screen allows waterborne silt and clay to pass therethrough which prevents screen from becoming blinded with these particles.

6 Claims, 4 Drawing Figures

PATENTED AUG 20 1974  3,830,373
Fig.1.
Fig.2.
Fig.3.
Fig.4.
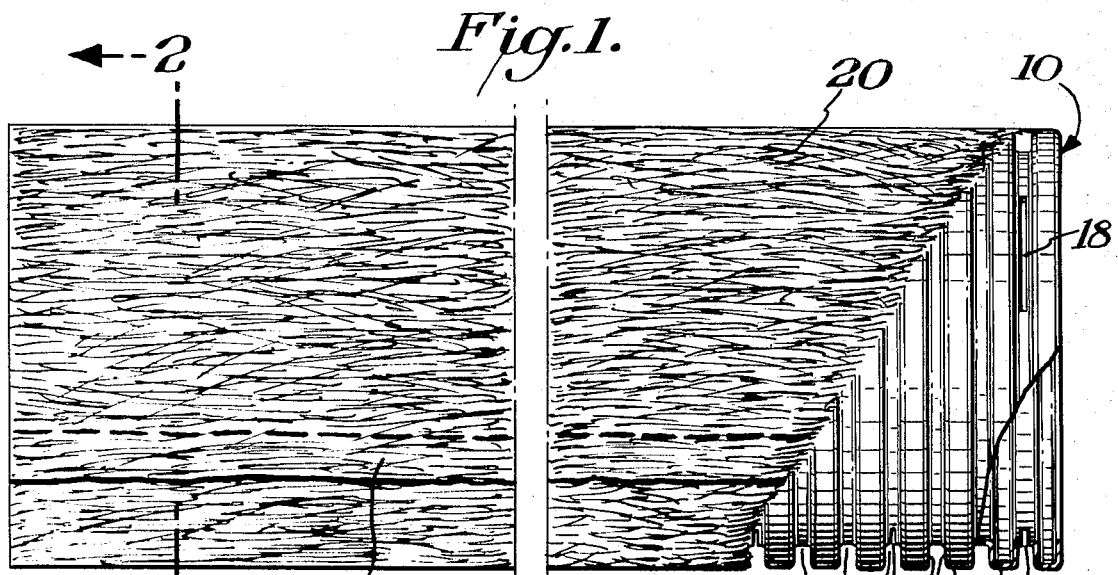
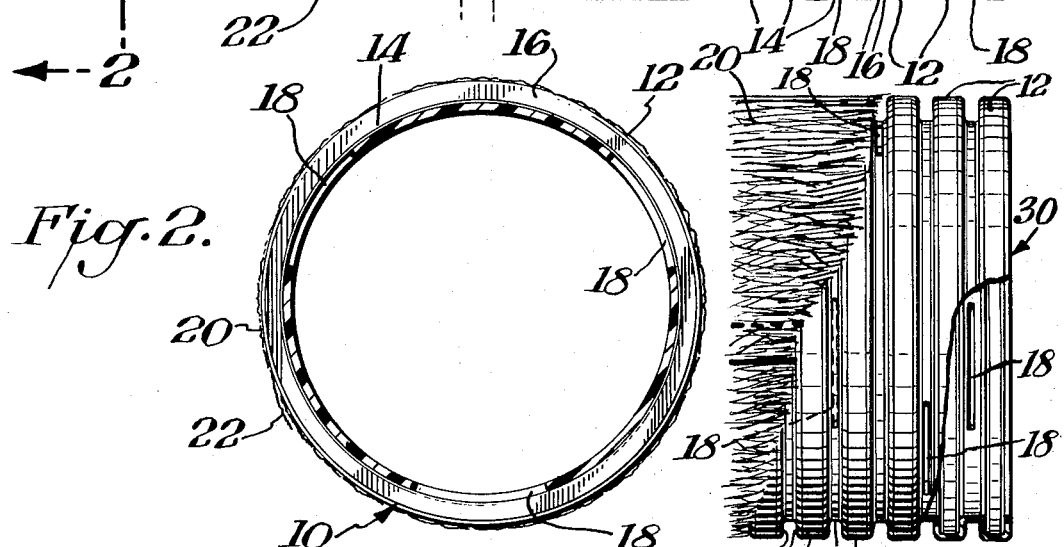
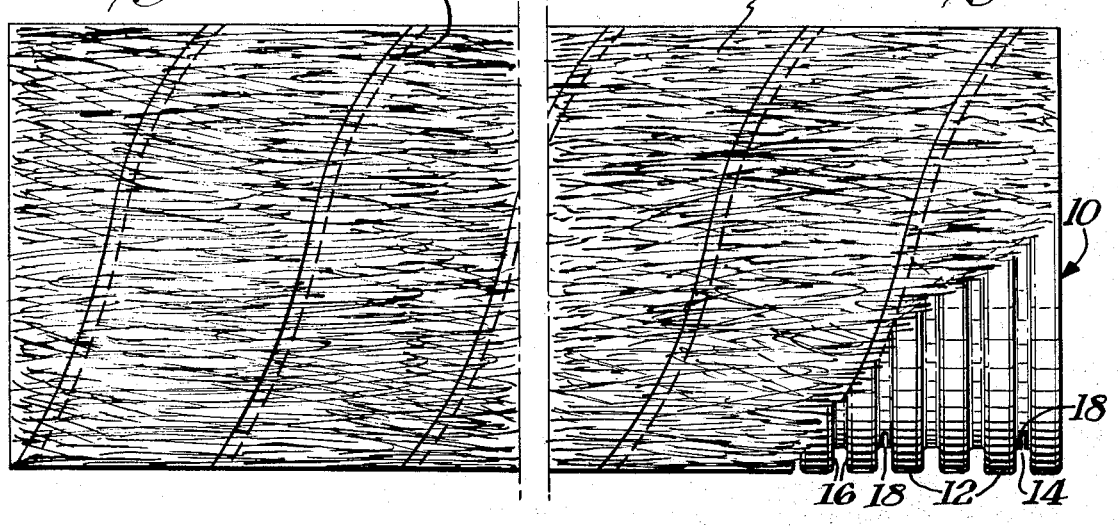

CORRUGATED DRAINAGE TUBE WITH RESTRAINING SCREEN

CROSS REFERENCE TO RELATED APPLICATIONS

The present application is a continuation-in-part of application Ser. No. 56,098, filed June 30, 1970, now U.S. Pat. No. 3,699,684, which in turn is a continuation of application Ser. No. 819,339, filed Apr. 25, 1969, now abandoned, which in turn is a continuation of application Ser. No. 663,051, filed Aug. 24, 1967, now abandoned.

BACKGROUND OF THE INVENTION

The present invention relates to corrugated drainage tubes, and more particularly to a corrugated drainage tube having a restraining screen that prevents certain waterborne particles from entering the tube which might otherwise cause the tube to become clogged, while allowing waterborne slit and clay to pass therethrough.

Prior to the present invention, land improvement by providing proper drainage was an expensive and time-consuming operation. The red clay tile commonly used for this purpose required the piecing together of relatively short lengths to construct a desired subsurface drainage system. These systems were vulnerable to misalignment due to the large number of lengths required to construct them. Moreover, extreme care was required when the system of tiles was covered with earth in order to avoid breakage of the tile material. Corrugated drainage tubing has now replaced the heretofore tile drainage systems.

In all subsurface drainage networks, consideration must be given to the problem of the tubing becoming plugged with fine sandy soils and similar materials. In the past, several approaches were used to prevent or reduce the amount of fine sand entering the drainage tubes. Pea-size gravel envelopes were placed around the drain line at a thickness of 3 to 6 inches. Although this method is somewhat effective, it is very costly and adequate gravel is not always available at the site where the tubing is installed. For the most part, the gravel reduces the velocity of the water entering the line to thereby cause larger waterborne particles to settle out before entering the drainage system. Combination coarse sand and gravel envelopes have also been used where these materials are available. However, the cost of the materials and the installation expenses are prohibitive in most parts of the country.

Sawdust, pine mulch, corncob mulch and similar materials are also used to surround subsurface drainage systems, but here again purchase and installation costs are high.

Also, relatively thick fiberglass mats have been used in conjunction with subsurface drainage systems, in an unsuccessful attempt to prevent clogging of the systems with fine sand and similar materials. For the most part, the fiberglass mats were installed on top of the drainage line after the line was located below grade. In other applications, fiberglass was installed on the bottom of a drainage line and a sheet of polyethylene installed on top of the line. Whatever the reasons for such installation techniques, the drainage tubing either became plugged with fine sand and similar materials or the filter material itself became clogged with waterborne silt and clay. Additionally, installation separate from the tubing was required and errors in installation were common.

Combinations of the above techniques have also been used with little success.

The prior art also illustrates other attempts to prevent the clogging of subsurface drainage systems. For example, Hegler U.S. Pat. No. 3,440,822, granted Apr. 29, 1969, and McDuff U.S. Pat. No. 3,103,789, granted Sept. 17, 1963 disclose drainage pipe wherein filtering material is utilized. For reasons explained below in conjunction with the present invention, these disclosures are significantly different and far afield from the present tubing.

SUMMARY OF THE INVENTION

Accordingly, it is an object of the present invention to provide a corrugated drainage tube having a restraining screen that prevents waterborne particles, such as fine and medium sand, from entering the tube which might otherwise cause the tube to become plugged with these particles, while allowing the passage of waterborne silt and clay which might otherwise cause the restraining screen to become blinded.

In accordance with the present invention, a flexible corrugated drainage tube has alternating annular peaks and annular valleys with walls interconnecting the peaks and valleys. A plurality of openings is provided in selected valleys of the tube and these openings are arranged transversely to the longitudinal axis of the tube so that liquid water can drain into the tube through the openings. A water permeable restraining screen surrounds the tube and engages the peaks thereof for restraining waterborne particles above a predetermined size range from entering the tube when water drains into the tube through the screen and openings.

Preferably, the restraining screen may be fabricated of spun bound filamentary material, with the weight of the screen in the range of 0.3 to 2.0 ounces per square yard and the denier $5 \pm 1.5$ for 0.5 to 2.0 ounce weight and $3 \pm 1.0$ for 0.3 to 0.4 ounce weight.

The restraining screen may include overlapping edge portions secured together along a line substantially parallel to the longitudinal axis of the tube. Alternatively, the screen may include overlapping edge portions secured together along a line that spirals around the tube.

In one of the embodiments of the present invention, the plurality of openings in selected valleys of the drainage tube includes a single opening in each valley. In another embodiment of the present invention, the plurality of openings in the tube valleys includes a plurality of openings in every third valley.

BRIEF DESCRIPTION OF THE DRAWING

Novel features and advantages of the present invention in addition to those mentioned above will become apparent to those skilled in the art from a reading of the following detailed description in conjunction with the accompanying drawing wherein:

FIG. 1 is an elevational view of a corrugated drainage tube according to the present invention, with portions broken away to show the details thereof;

FIG. 2 is a cross sectional view taken along line 2—2 of FIG. 1;

FIG. 3 is an elevational view similar to FIG. 1 illustrating another embodiment of the present invention; and FIG. 4 is a fragmental elevational view illustrating still another embodiment of the present invention, with portions broken away to show the details thereof.

DETAILED DESCRIPTION OF THE INVENTION

Referring in more particularity to the drawing, a flexible corrugated drainage tube 10 comprises a series of alternating substantially flat annular peaks 12 and substantially flat annular valleys 14 with side walls 16 interconnecting the peaks and valleys. The tube is preferably fabricated of durable, high-strength polyethylene although other materials are suitable. Extruding techniques are used to shape the tubing by forcing molten plastic through an annular orifice, as is well known. The formed plastic tube is then reshaped to provide the corrugations. Selected annular valleys 14 are provided with slotted drainage openings 18 so that liquid water can drain into the tube through the slotted openings after the drainage tube is installed below grade. As is well known, liquid water from the field in which the corrugated drainage tube 10 is installed passes into the tube and drains away into a main line, irrigation ditch, or waterway, for example.

In the embodiment shown in FIGS. 1-3 of the drawing, the slotted openings 18 are provided in every third annular valley of the corrugated drainage tube 10. Each third valley has three equally spaced apart openings, and the combined open area provided by the slotted openings in the tube is preferably between about 1½ and 1 percent of the longitudinal surface area of the tube. This percentage of slotted open area to the longitudinal surface area of the tube functions exceptionally well to adequately drain a field in which the tube 10 is installed. Alternative arrangements of the openings 18 are also available, as explained more fully below in conjunction with FIG. 4 of the drawing.

A water permeable restraining screen 20 surrounds the tube 10 and engages the substantially flat peaks 12. This screen restrains waterborne particles above a predetermined size range from entering the tube 10 when water drains into the tube through the screen 20 and the slotted openings 18. Also, the screen 20 allows waterborne silt and clay to pass therethrough which prevents the screen from becoming blinded with these particles. For reasons explained more fully below, the restraining screen 20 is preferably fabricated of spun bound filamentary material, such as nylon (polyamides), although spun bound and woven polyethylene, polypropylene, polyesters and similar materials are also suitable. One advantage of spun bound material is its strength since each of the fibers is physically secured to numerous other fibers comprising the screen.

The restraining screen 20 illustrated in FIGS. 1 and 2 comprises a sleeve having overlapping edge portions 22 secured together along a line substantially parallel to the longitudinal axis of the tube 10. Preferably, the overlapping edge portions 22 are sonically welded together. Alternatively, the edge portions 22 may be secured together with adhesive or similar materials. FIG. 3 shows another manner in which the restraining screen 20 is associated with the tube 10. In this embodiment of the present invention, the restraining screen material is spirally wound around the tube and the overlapping edge portions 24 are secured together along a line that spirals around the tube. The edge portions 24 may be secured together by sonic welding techniques, it being understood that adhesives and similar materials may also be used in place of sonic welding.

FIG. 4 illustrates another embodiment of the present invention wherein a corrugated drainage tube 30 is surrounded by a restraining screen 20 similar to the restraining screen shown in FIGS. 1 and 2. Additionally, the drainage tube 30 is almost identical to the tube 10 and similar reference characters are utilized to identify similar parts. In this regard, the only difference between the assemblies of FIG. 1 and FIG. 4 is the arrangement of drainage openings 18. Unlike the arrangement of openings 18 in FIG. 1, the openings 18 associated with the tube 30 are arranged with a single opening in each valley of the tube. The arrangement of openings may be staggered, as shown in FIG. 4, or alternative orientations may be utilized. Finally, as further explained below, the restraining screen 20 bridges the span between the peaks 12 and thereby leaves each valley 14 clear. This relationship increases the effective drainage inlet area to the area of each valley 14 in which an opening 18 is located. Without a screen arrangement the effective inlet area is limited to the area of the openings 18.

Turning now to the specifics of the preferred restraining screen 20 of the present invention, the spun bound filamentary material has a weight in the range of 0.3 to 2.0 ounces per square yard with a denier of $5 \pm 1.5$ for the 0.5 to 2.0 ounce weights and $3 \pm 1.0$ for the 0.3 to 0.4 ounce weights. The average thickness of this material ranges between approximately 4.0 to 14.0 mils. Materials having characteristics within these ranges function exceptionally well to restrain waterborne soil particles, like fine sand, from entering into the tube 10 which particles might otherwise enter and ultimately plug the tube. These materials allow passage of waterborne silt and clay which prevents the screen from becoming blinded with these particles. The waterborne silt and clay do not plug the tube since they are ultimately conveyed out of the tube with the drained water. The random size openings in materials within the above denier range but heavier than 2.0 ounces per square yard are too small, and in use the material itself becomes clogged with silt and clay particles. Some restraining screen action is achieved with materials lighter than the above noted range, but these materials have limited strength and preinstallation handling often causes tearing or other damage. Material manufactured by Monsanto Co. and sold under the trademark "CEREX" is one type which functions well as a restraining screen. "CEREX" is a spun bound polyamide manufactured in sizes ranging from 0.3 to 2.0 ounces per square yard with a denier of $5 \pm 1.5$ for 0.5 to 2.0 ounce weights and $3 \pm 1.0$ for 0.3 to 0.4 ounce weights. "CEREX" is also made to specifications that fall outside of the above range.

As explained above, the screen 20 functions to restrain waterborne particles above a predetermined size range from entering the tube 10 when water drains into the tube through the screen and the slotted openings 18. Essentially, during the draining operation, particles of varying size interfere with one another at the outer boundary of the screen. As a result, channels or interstices are formed that allow water to flow through the screen 20 while restraining waterborne soil particles above a certain size from passing through the screen into the tube through the slotted openings 18. Soil particles smaller than the thus formed channels or interstices pass into the tube with the water, and these particles are ultimately conveyed out of the tube along with the draining water. In essence, the restraining screen of the present invention prevents those larger waterborne soil particles from entering the tube which might otherwise cause the tube to become clogged, but allows small waterborne particles to pass. Without such passage the small particles would blind the screen and the blinded screen would prevent water from draining into the tube.

For the most part, the vast majority of the openings in the restraining screen 20 range between approximately 20 and 75 microns. Soil particles above 75 microns in size, such as waterborne fine sand and the like, are restrained from entering the tube, while waterborne silt and clay (less than about 20 microns) freely pass therethrough. Soil particles larger than silt and clay but smaller than fine sand, for example, broken sand particles, also pass through the screen. The waterborne particles that enter the tube have sufficient velocity and are light enough that they do not settle out in the tube and are ultimately conveyed out of the tube with the water.

The present invention has significant advantages in comparison to the heretofore available devices allegedly designed to prevent clogging of drainage tubes. First, since the restraining screen 20 surrounds the tube 10, either as a sleeve (FIGS. 1–2, 4) or a spiral wrap (FIG. 3), proper installation is easily achieved. There is very little chance of the screen becoming dislocated from its proper position relative to the tube. Another advantage is that the tube 10 and its associated restraining screen 20 are installed simultaneously thereby eliminating a second installation step which is necessary when the tube and any material associated with it are separately installed. In the case of the present invention the installation is the same as with regular drainage tubing. Also, the restraining screen bridges the span between the peaks 12 and thereby leaves the valleys 14 clear. Such cooperation between the screen 20 and the corrugations of the tube 10 increases the effective drainage inlet area to the area of the entire valleys 14 rather than just the slotted openings 18.

As explained above, nylon is a particularly advantageous material for the fabrication of the restraining screen 20. Being hydrophilic, a nylon restraining screen causes a wick-type action in assisting and allowing water to pass through the material. On the other hand, materials which are hydrophobic tend to resist the flow of water. Still another advantage of nylon as the fabricating material for the restraining screen 20 is that this material is also hydroscopic and actually swells 6 to 7 percent when wet. This causes a constant movement of the screen during the wetting and drying cycles of the surrounding earth and aids in cleaning the screen whereby the function of the screen is considerably improved.

What is claimed is:

1. A flexible corrugated drainage tube having alternating annular peaks and annular valleys with walls interconnecting the peaks and valleys, a plurality of openings in selected valleys of the tube arranged transversely to the longitudinal axis of the tube whereby liquid water can drain into the tube through the openings, and a flexible spun bound water permeable restraining screen in the form of a sleeve surrounding the tube and engaging the peaks thereof for restraining waterborne particles approximately 75 microns and above from entering the tube and allowing waterborne particles approximately 20 microns or less to enter the tube when water drains into the tube through the screen and the openings.

2. A flexible corrugated drainage tube as in claim 1 wherein the weight of the restraining screen is in the range of 0.5 to 2.0 ounces per square yard and the denier is $5 \pm 1.5$.

3. A flexible corrugated drainage tube as in claim 1 wherein the weight of the restraining screen is in the range of 0.3 to 0.4 ounces per square yard and the denier is $3 \pm 1.0$.

4. A flexible corrugated drainage tube as in claim 2 wherein the weight of the restraining screen is 0.5 ounces per square yard and the denier is $5 \pm 1.5$.

5. A flexible corrugated drainage tube as in claim 1 wherein the restraining screen includes overlapping edge portions secured together along a line substantially parallel to the longitudinal axis of the tube.

6. A flexible corrugated drainage tube as in claim 1 wherein the restraining screen includes overlapping edge portions secured together along a line that spirals around the tube.

* * * * *